Patented July 23, 1974

3,825,458
METHOD OF MAKING HYDROGEL LAMINATES
Otto Wichterle and Karel Kliment, Prague, Czechoslovakia, assignors to Ceskoslovenska Akademie ved, Prague, Czechoslovakia
No Drawing. Original application Feb. 25, 1969, Ser. No. 808,202, now abandoned. Divided and this application Nov. 22, 1971, Ser. No. 201,235
Claims priority, application Czechoslovakia, Mar. 6, 1968, 1,767/68
Int. Cl. B29d 7/02
U.S. Cl. 156—242                                     13 Claims

ABSTRACT OF THE DISCLOSURE

A comparatively thick sheet of a spongy hydrogel, made e.g. by polymerizing ethylene glycol monomethacrylate in presence of less than 2 percent of a cross-linking agent and more than 60 percent of water, is laminated with a much thinner sheet of the same or similar, but homogeneous hydrogel, either from one side or from both sides. Alternatively, one external layer may be less hydrophilic or fully hydrophobic. The lamination is carried out so that the external thin layer is made on a glass or other smooth pad, either by polymerizing a cross-linked or linear polymer thereon, or by casting a thin layer of a dissolved linear polymer. Then a monomer mixture for spongy hydrogel is cast onto the first layer and polymerized. A sandwich structure is obtained if the monomer mixture for spongy hydrogel is cast between two pads provided with a thin homogeneous polymer layer. Hydrogel laminates and sandwich structures are useful e.g. for surgical and cosmetic purposes, for filtering liquids etc.

---

This is a division of application Ser. No. 802,202, filed Feb. 25, 1969, now abandoned.

The U.S. Patent Specifications Nos. 2,976,576 and 3,220,960 disclose sparingly cross-linked hydrophilic polymers, particularly such derived from glycol methacrylate and glycol acrylate polymers, polymerized in presence of less than 2% of a cross-linking agent and in presence of water or water-miscible inert liquids such as glycols or glycerol. In presence of less hydrophilic co-monomers, or in presence of excessive amounts of water, in which the copolymer thus formed swells but to a limited degree so that the liquid phase separates in fine droplets during the polymerization, a spongy, porous structure is formed which may be utilized for various purposes, particularly for making prostheses, or for filtering etc.

In surgery, the prostheses made from said spongy hydrogels are used being first saturated with physiologic solution, and, if desired, with antibiotics or other physiologically active substances. If the pores are larger than about 100µ and particularly if they are filled up with collagen (according to the U.S. Patent application No. 691,947 now U.S. Pat. 3,563,925, dated Feb. 16, 1971) the neighboring tissue grows into the pores and the spongy hydrogel prosthese is firmly bound to the tissue. In some cases, however, a part of the surface should remain free so that the growth of the tissue into such part is avoided.

Hydrogels of the above mentioned kind may be also used as carriers for physiologically active substances for internal or external application, according to the U.S. Patent application No. 607,637 now U.S. Pat. 3,551,556, dater Dec. 29, 1970. In said carriers, the controllable diffusion of drugs through a defined layer of the hydrogel makes it possible to secure a locally increased concentration for a predetermined time. Hydrogel sponge is capable of retaining very large amounts of drugs, the biologically active substance is, however, liberated therefrom too rapidly when in direct contact with living body. An exact control of the treatment is then impossible. It was thus proposed to use spongy hydrogel as a core imbided with a physiologically active substance, onto which a layer of homogeneous cross-linked hydrogel is then cast by polymerization. This method has, however, certain shortcomings. The liquid monomer mixture penetrates irregularly into the pores so that the homogeneous external layer possesses a very uneven thickness. Moreover, some drugs are unstable in contact with polymerization initiators and activators or even monomers. These circumstances impair the accuracy of doses and make control difficult.

Similar shortcomings could be observed when using spongy hydrogels as surgical dressing material. The penetrability is sometimes too high so that the possibility of an infection cannot be excluded, the dressing dries too rapidly or the drug or disinfectant, incorporated therein, is liberated in an uncontrollable way.

All of the above shortcomings of spongy hydrogels can be avoided by laminating them according to present invention with a thin layer or a homogeneous polymer, particularly hydrogel. The lamination is carried out by making the thin external layer separately on a smooth pad, e.g. a glass plate, either by polymerization-casting or by solution-casting. The subsequently polymerization-cast spongy hydrogel is perfectly bound with the external layer since some monomer penetrates into the latter and secures the bond by polymerization and chain-transfer reactions. The thickness of the homogeneous external sheet remains, however, unchanged, the biologically active substance penetrates its uniform layer evenly, the growth of the surrounding tissue into the implantate is avoided, the evaporation of water controlled and the penetration of microbes and viruses made impossible. The external thin sheet can be composed, if desired, of two layers having different properties, particularly if the outer layer should be fully hydrophobic. Then, an intermediate layer which is less hydrophilic than the hydrogel but warranting a firm bond between the latter and the hydrophobic outer layer may be useful.

In order to obtain even, non-corrugated outer layers, it is necessary to maintain the swelling degree of the two layers, of the homogeneous and the spongy one, on the same level, advantageously such as will be during the use of the laminate in equilibrium with the surrounding medium.

For building thin homogeneous layers, soluble, non-cross-linked glycol methacrylate or acrylate polymers, prepared according to the U.S. Patent application No. 639,021 now U.S. Pat. 3,575,946, dated Apr. 20, 1971, may be used. Choosing a proper solvent and polymer concentration makes possible to gain very thin and uniform foils. After evaporating the solvent a monomer mixture for spongy hydrogel is cast onto the foil. Since the hydrogel foil is swelling in the monomer mixture, the monomers penetrate into the thin foil which is then covalently bound to the spongy hydrogel by entangled macromolecules and by grafting the growing chains onto the polymer of the foil. The cross-linking agent, contained in the monomer mixture provokes cross-linking of the soluble glycol methacrylate or acrylate polymer which contains some vinyl sid groups. As a result, the originally soluble polymer of the outer foil becomes insoluble.

The use of soluble glycol methacrylate or acrylate polymers instead of polymer-cast layers has the advantage of enabling much simpler processing and broader versatility, the solutions for casting the foil being preparable in a wide range of viscosities and average molecular weights in mixtures of solvents having different volatility.

By washing in water or in another swelling liquid the whole laminate is easily separated from the plate on which the outer homogeneous foil has been prepared.

Washed laminated or sandwich structure is then sterilized by boiling and kept in a sterile physiologic solution containing, if desired, antibiotics, disinfectants or other preservation means or drugs.

A sandwich structure is made in the same way, only the monomer mixture for spongy hydrogel is cast between two plates provided on their inner sides by a thin homogeneous foil of the same or other polymer.

Large laminated sheets may be cut to pieces of appropriate shape and size. The side surfaces of the hydrogel sponge may be made tight, if desired, either by dipping them into a polymerizing mixture for homogeneous hydrogel, or by bonding them with another thin foil in the way described above, the initiated monomer mixture for spongy hydrogel being preferably used as adhesive. If desired, however, any other sufficiently hydrophilic adhesive may be used for said purpose.

The smooth pad, on which the thin homogeneous foil is prepared, may be removed, after finishing the laminate or sandwich structure, either by simple stripping, preferably in swollen state, or also by dissolving it in a suitable agent. For instance, a glass plate can be removed by dissolving it in diluted hydrofluoric acid and washing the fluorosilicates out from the laminate. This method is advisable in cases where the laminate has a rather complex shape, the glass pad being so enclosed in the hydrogel body that it could not be removed otherwise without damaging the laminate. An example is a pad consisting of a sheet, a fibre or a rod of glass, particularly a bent one. The hydrofluoric acid diffuses through the outer spongy layer and the inner homogeneous hydrogel layer and dissolves the glass. Preferably special glasses are used for this purpose, leaving no insoluble residue after having been decomposed by hydrofluoric acid. This special embodiment of the invention is a novel modification of the process disclosed in Example 2 of the U.S. Patent Specification No. 2,976,576 of the same inventor, wherein, however, no laminates with spongy core and homogeneous outer layer were mentioned.

The outer layer may be reinforced, if desired, by a thin fabric or knitted fabric made from suitable, particularly synthetic fibres such as polyethylene terephthalate. Similar reinforcing inserts may be used for strengthening the spongy hydrogel layer.

The laminates according to the invention may be manufactured either discontinuously or continuously. For batchwise manufacture it is possible to use, for example molds in the form of glass or chromium-plated metal sheets provided with a side-wall of appropriate height. For laminates provided on both sides with a homogeneous layer two such molds are combined, with elastic sealing means between them.

Continuous manufacture may be carried out on a conveyor formed from appropriate non-adhesive plastic such as polytetrafluorethylene on which is first provided with a thin layer from homogeneous polymer, e.g. soluble ethylene glycol methacrylate polymer dissolved in aqueous ethyl alcohol. An already polymerizing monomer mixture for the spongy hydrogel is cast onto the dried thin layer. The conveyor is moved into a space filled with inert gas and kept at suitable temperature at which the polymerization to high conversion is finished during several minutes. The time and temperature of the polymerization depends on the initiating system used. Redox systems such as soluble persulfates with reducing substances and traces of iron or copper ions are apt to induce a more rapid polymerization than persulfates alone or azo-initiators (e.g. azo-bis-isobutyronitrile). The conveyor is preferably tilted in the direction of proceeding polymerization so that the already polymerized mixture bars the way to the still liquid viscous mixture which cannot overflow. The sides of the conveyor are provided with elastic raised borders or otherwise secured against overflowing of the mixture.

The thin homogeneous film can be also led through the polymerization space in the form of a separate foil, laid freely onto the conveyor.

Instead of an endless conveyor, a series of long troughs may be used with the homogeneous thin layer formed on their bottom can be intermittently or continuously transported through a polymerization space, being laid transversely onto one or more conveyors.

In continuous manufacture, the viscosity of the monomer mixture is increased either by starting the polymerization prior to the casting but casting prior to attaining the gel point, or by adding soluble polymer, e.g. such made according to the U.S. Patent Application No. 639,021, or by both of said measures. The first way involves the use of so called pre-polymers, the polymerization of which was discontinued for certain time, e.g. by cooling down. Another means for increasing the viscosity is admixture of finely powdered fillers such as silicium dioxide. A particularly suitable filler consists of finely ground waste sparingly cross-linked hydrogel of the same or similar kind as formed by polymerization of the monomer mixture for spongy hydrogel. Such filler swells considerably in the monomer mixture and strongly increases the viscosity thereof. It is then bound with the spongy hydrogel by numerous covalent bonds caused by chain transfer as well as by entangling the growing chains into the polymer structure of the filler.

The laminate can be removed from the pad e.g. by immersing the whole into a liquid in which the hydrogel is swelled more than in water present in the monomer mixture. Such liquid may be for instance ethyl alcohol. In this way the laminate, adhering by its outer homogeneous layer firmly to the pad, is loosened from the latter and simultaneously the soluble residues of the initiating system are washed out. The separated laminate is then washed in water, sterilized and immersed into a physiologic solution (i.e. an aqueous electrolyte solution which is isotonic with liquids of the human body, e.g. a 0.8% sodium chloride solution).

Laminates of the invention are valuable where a soluble substance has to penetrate by diffusion from the spongy hydrogel outward through a thin homogeneous layer. If the diffusion has to be slow, an appropriate polymer is used for building the outer layer, allowing the substance in question to diffuse at a suitable rate. For instance in forming an article for replacing the skin, the outer layer must be chosen so as to avoid rapid evaporation of water. A thin layer of butylmethacrylate or similar polymer may be useful in such a case, covered by an intermediate layer of a glycol methacrylate-methyl methacrylate or similar copolymer.

The term "glycol" used throughout the specification means not only ethylene glycol, but also diethylene glycol, triethylene glycol and their mixtures, as well as propylene and butylene glycols and their co-polycondensates with ethylene glycol.

The respective acrylate polymers are a bit more hydrophilic and less stable, but their stability is quite sufficient for surgical and most other purposes.

From various hydrogels the glycol methacrylate and acrylate polymers proved best, until now, because they are very well tolerated by living body. Nevertheless, they may be partly or wholly replaced by similar polymers and copolymers based on other hydrophilous monomers such as acrylamide, methacrylamide, copolymers of acrylonitrile with sodium methacrylate or acrylate etc. As cross-linking agents glycol bis-methacrylates and acrylates are most suitable, being usually present in purified monoesters in appropriate concentration, i.e. less than 2 percent. Other suitable cross-linking agents are e.g. N,N'-methylene-bis-methacrylamide, triacryloyl perhydrotriazine and similar. Any sparingly cross-linked hydrophilic polymer which is physiologically inert and sufficiently stable can be used for the purpose of the invention.

All parts and percentages in the specification and Examples are meant by weight, if not stated otherwise.

EXAMPLE 1

A 10% solution of soluble, non-cross-linked ethylene glycol methacrylate polymer in a mixture of 80% of ethanol and 20% of water was cast onto a horizontal glass plate provided with a tight frame. The amount of the cast solution was chosen with respect to the size of the plate so as to obtain, after evaporating the solvent, a 0.1 mm. thin polymer layer. The solvent was evaporated at room temperature in order to obtain smooth, transparent glossy surface. Then the plate was heated to 60° C. and following monomer mixture was poured onto the polymer layer: 30% of ethylene glycol monomethacrylate (containing 1.0% of bis-methacrylate) and 70% of a 10% solution of ammonium persulfate in distilled water. The mold was then covered by another glass plate under which carbon dioxide was led in. Polymerization was finished in 15 minutes. The mold was cooled down to room temperature, the spongy polymer spread with water and after an hour slowly stripped from the plate. The bond between the spongy layer and the homogeneous foil was very strong and the polymer of the homogeneous foil became absolutely insoluble in all solvents, in which the polymer readily dissolved before.

EXAMPLE 2

Thin foils (0.03 to 0.05 mm.) were formed on two glass plates by polymerizing a mixture of ethylene glycol monomethacrylate, containing 0.3% of ethylene glycol bis-methacrylate, by adding 0.2% of di-isopropyl percarbonate and covering the plates with oxygen-free gas (carbon dioxide). The mixture was degasified prior to having poured it onto the glass plates, heated to 65° C. After a while the mixture gelified. It was then covered by a polyethylene foil and by the other plate, so that the polyethylene foil was between the two polymerizing layers. After further 20 minutes the polymerization was finished, the plates were cooled down to the room temperature, the two plates separated and the polyethylene foil carefully removed.

Then a mold was formed by clamping the two plates together, with the hydrogel layers inside and a distance strip from silicone rubber (2 mm. thick) between them. The mold was then immersed into a water-thermostat heated to 60° C., filled up with a monomer mixture for spongy hydrogel of the composition stated in Example 1 and left to polymerize for 20 minutes. Then the distance strip was removed and the mold immersed into distilled water. After several hours the swollen sandwich might be easily separated from the glass plates.

EXAMPLE 3

Glass fibre bundle, diameter of single fibre 40–50$\mu$, total diameter of the bundle 15 to 20 mm., length 100 to 120 mm. was first polymerized into hydrophilic polymer at its one end, by inserting 5–8 mm. of the bundle into a glass tube, inner diameter 25–28 mm., using monomeric mixture of the following composition: 80% of ethylene glycol monomethacrylate, containing 0.2% of the diester, and 20% of methyl methacrylate. As initiator, 0.3% of tert. butyl peroctoate was added. The polymerization was carried out at 60° C. under inert gas. Care was taken to maintain the fibers in parallel position. When one end of the bundle was anchored in a polymer block, the other end was treated in the same way. The fiber bundle with both ends thus fixed was then repeatedly dipped into an 8% solution of soluble ethylene glycol methacrylate polymer in methanol so as to secure coating all fibers with a thin layer of the polymer. After evaporating the solvent the bundle with the two fixed ends was put into a test tube having diameter about 1 mm. larger than htat of the fixed ends. A monomer mixture for spongy polymer, consisting of 20% ethylene glycol methacrylate, containing 0.8% of the diester, and 80% of a 10% ammonium persulfate aqueous solution, was poured into the test tube which was then degasified by applying several times reduced pressure of a water jet air-pump. The temperature of polymerization was 60° C. After 30 minutes the spongy rod was carefully removed from the test tube, the two head surfaces cut off in order to uncover the fiber ends and the whole was immersed for 5 hours into a 35% hydrofluoric acid. The spongy set of parallel capillaries was then thoroughly washed in distilled water and inserted into a perforated tube. It could be used for filtration.

EXAMPLE 4

A pre-polymer was prepared by careful heating a mixture consisting of 60% of ethylene glycol monomethacrylate, containing 0.2% of the diester, and 40% of a mixture of 1,2 and 1,3-glycerol diacetate, adding 0.05% of dibenzoyl peroxide as initiator of polymerization. The polymerization was discontinued as soon as the refractive index of the prepolymer attained the value $n_{20}=1.4670$. The prepolymer had a consistency suitable for casting or coating for continuous manufacture of laminates. After having admixed further 0.05% of di-isopropyl percarbonate and degasified the prepolymer polymerized to high conversions at 65° C. during 10 to 15 minutes. By adding more initiator the polymerization time can be reduced up to about 2 minutes.

The pregel was used for casting a thin foil on a glass plate. The monomer mixture for spongy hydrogel according to Example 1 was polymerized at room temperature onto the foil during about 8 hours.

EXAMPLE 5

A grit made from waste, dried, sparingly cross-linked hydrogel (made originally by polymerizing 60% of ethylene glycol monomethacrylate containing 0.2% of the diester, 20% of diethylenglycol monomethacrylate, containing 0.3% of the respective diester, 0.25% of di-isopropyl percarbonate and 19.75% of water, grain size 0.10 to 0.16$\mu$, was swelled for 3 hours in a mixture of ethylene glycol monomethacrylate, containing 0.3% of the diester. Then the mixture was thickened by adding 2% of powdered soluble non-cross-linked, ethylene glycol methacrylate polymer and polymerized under inert gas with 0.2% of di-isopropyl percarbonate at 60° C. in a thin layer on a chromium-plated metal sheet. Onto the polymerized foil the initiated monomer mixture for spongy hydrogel according to Example 3 was poured and polymerized. The bond between the two layers was very strong.

EXAMPLE 6

A 5% solution of polyvinyl acetate (average molecular weight 55,000) in acetone was cast onto a horizontal glass plate and left to evaporate at the room temperature to a 0.03 mm. thick foil. Onto this foil, another 1 mm. thick even layer of the prepolymer according to Example 4 was spread, initiated by 0.05% of diisopropyl percarbonate. The layer of the prepolymer was covered with a polyethylene foil and left to polymerize at 60° C. The 1 mm. thick layer of the hydrogel is overlaid by a 5 mm. thick layer, consisting of 30 parts (by weight) of ethylene glycol monomethacrylate, 0.1 p. of ethylene glycol dimethacrylate, 60 p. of a 1% solution of ammonium persulfate in distilled water and 8 p. of dry powdered soluble ethylene glycol monomethacrylate polymer. When a homogeneous mixture has been formed, 1.9 p. of dimethylaminoethyl acetate is added while stirring and the mixture is brought onto the foil mentioned above and left to polymerize under an inert gas to a spongy polymer.

In similar way there is possible to create various outer layers, even from quite hydrophobic polymers such as polyisobutylene, if a rapid drying out of the laminate is to be avoided. A less hydrophobic intermediate layer could be interposed, as mentioned above.

EXAMPLE 7

A solution of 5 parts of sodium polymethacrylate and 5 p. of glycerol in 80 p. of water was poured onto a horizontal paper pad 1 mm. thick, and dried freely on the air. A one percent ethanolic solution of polyvinyl acetate, average molecular weight 10,000, was poured in a 0.5 mm. thick layer onto the pad and freely evaporated at room temperature. Further layer was formed by evaporating a 0.5 mm. thick layer of a 10% ethanolic solution of soluble, non-cross-linked polymeric ethylene glycol methacrylate. Then a 2 mm. thick layer of spongy hydrogel was polymerized onto the last layer, using the monomeric solution according to Example 1. After swelling the whole in water, the paper pad could be easily removed, leaving a laminate with very thin hydrophobic outer layer and spongy core.

EXAMPLE 8

The process according to Example 7 was repeated with the difference that a chromium plated smooth metal sheet was used as the pad, onto which a thin polyethylene terephthalate knitted fabric was cemented with a self-curing silicone rubber prepolymerizate. After the curing finished a very thin film of poly(butylmethacrylate) varnish was applied to, and finally a 2 mm. thick layer of spongy hydrogel as described in Example 1 was formed.

EXAMPLE 9

The process according to Example 3 was repeated, except that the glass fibers were coated previously, during the spinning process, with a thin layer of soluble glycol methacrylate polymer. The preparation of the fibers made easier the textile treatment such as winding up to skein etc.

The soluble glycol methacrylate polymer may be prepared either by simple polymerization of a pure monoester (see e.g. the Czechoslovakian Pat. No. 94,363), or by polymerization of a diester-containing monoester in presence of a good solvent according to the U.S. Patent application No. 639,021, avoiding the cross-linking. Such polymer is soluble e.g. in a 50% aqueous ethanol, but fully insoluble in water or in liquids of the human body. It may be admixed to the aqueous monomer mixture either in the form of a dry powder, or as a dispersion in water. During the polymerization with the monomer mixture for spongy hydrogel the soluble polymer is interpolymerized therewith by grafting.

For thickening the aqueous monomer mixture to avoid its flowing down from the pad or from a plastic conveyor it is possible to use soluble polymers such as sodium polymethacrylate or similar, which are then washed out from the spongy hydrogel, if they were not bound by interpolymerization.

When using the laminate according to the invention for dressing burnt wounds or other comparatively large injured skin surfaces, it is advantageous to provide the homogeneous layer with very fine holes which make possible the removal of the exudate without allowing access to the bacteria. Such holes may be made e.g. by treating the dry homogeneous layer on the pad with a sharp brush, or by similar treatment of the finished laminate with appropriate tools.

Instead of forming the thin homogeneous foil on a solid pad, it is possible to use ready made polymer foil and to polymerize the spongy hydrogel thereto either directly or by means of an intermediate layer as mentioned above.

What we claim is:

1. Method of manufacturing hydrogel laminates consisting of a thin film layer of an originally soluble, non-crosslinked homogeneous hydrogel polymer and a substantially thicker layer of a spongy cross-linked hydrogel, comprising casting said homogeneous hydrogel polymer film layer on a solid pad, and thereafter a monomer mixture capable of forming said spongy hydrogel layer is polymerized in situ over said film layer on said pad.

2. Method according to claim 1, wherein an intermediate layer is cast onto said thin film layer by polymerizing a monomer mixture prior to polymerizing said spongy hydrogel thereon, said intermediate layer being less hydrophobic than said thin film layer but capable of swelling it and forming a bond between said layer and said spongy hydrogel.

3. Method according to claim 1, wherein the thin film layer is cast onto said pad by applying thereon a polymer solution which is thereafter dried by evaporating any solvent from said solution.

4. Method according to claim 1, wherein the monomer mixture for said spongy hydrogel is first thickened by partial polymerization discontinued prior to reaching the gel point, the polymerization being completed subsequent to spreading the mixture onto the thin film layer.

5. A method of manufacturing hydrogel laminates according to claim 1, wherein said solid pad is first coated with a water soluble glycol methacrylate polymer, operative to form a separating layer between the polymers polymerized onto said pad.

6. Method according to claim 1, wherein the thin film layer contains vent holes.

7. Method according to claim 2, wherein said monomer mixture for said spongy hydrogel contains a polymerization initiator and is spread over said intermediate layer onto which it is then polymerized.

8. Method according to claim 1, wherein said monomer mixture for said spongy hydrogel is thickened by adding a suitable powdered filler thereto.

9. Method according to claim 8, wherein the filler is a ground hydrogel.

10. Method according to claim 8, wherein the filler is a powdered soluble, non-cross-linked glycol methacrylate or -acrylate polymer.

11. A continuous process for carrying out the method according to claim 1, wherein a thickened monomer mixture for said spongy hydrogel is cast onto an endless conveyor containing a previously polymerized polymer of said thin film layer, said conveyor being in a heated polymerization zone containing an inert oxygen-free gas thereby completing the polymerization.

12. A continuous process according to claim 11, wherein said endless conveyor contains at least said two film, any subsequent film polymerized thereon being more hydrophilic than the previous one and being formed from a monomer mixture capable of swelling the next succeeding lower film.

13. A continuous process according to claim 11, wherein said endless conveyor is previously coated with a water soluble glycol methacrylate polymer, operative to form a separating layer between the polymers polymerized onto said pad.

References Cited

UNITED STATES PATENTS

| | | | |
|---|---|---|---|
| 3,220,960 | 11/1965 | Wichterle et al. | 128—127 |
| 2,730,768 | 1/1956 | Clarke | 264—104 |
| 3,557,261 | 1/1971 | Wichterle | 264—1 |
| 3,166,435 | 1/1965 | Meier | 264—212 |
| 3,362,942 | 1/1968 | Monon | 161—247 |
| 3,686,024 | 8/1972 | Nankee et al. | 128—284 |
| 3,429,957 | 2/1969 | Merten | 264—212 |
| 3,669,103 | 6/1972 | Harper et al. | 128—284 |
| 3,069,728 | 7/1957 | Mindick et al. | 156—246 |
| 2,976,576 | 3/1961 | Wichterle et al. | 3—1 |
| 2,731,411 | 1/1956 | Clarke | 264—104 |

CHARLES E. VAN HORN, Primary Examiner

C. WESTON, Assistant Examiner

U.S. Cl. X.R.

156—246; 161—166, 254, 256; 264—212